April 28, 1970  C. H. GOLDINGAY  3,508,972
BATTERY WITH FILLING VENTING DEVICE
Filed Dec. 20, 1968  3 Sheets-Sheet 1

April 28, 1970   C. H. GOLDINGAY   3,508,972
BATTERY WITH FILLING VENTING DEVICE
Filed Dec. 20, 1968   3 Sheets-Sheet 2
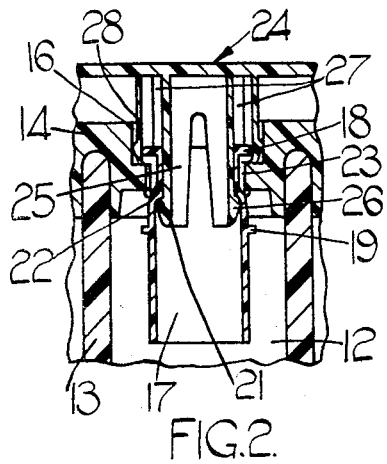
FIG.2.
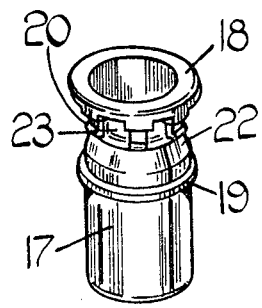
FIG.3.
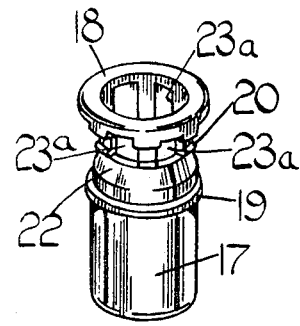
FIG.4.
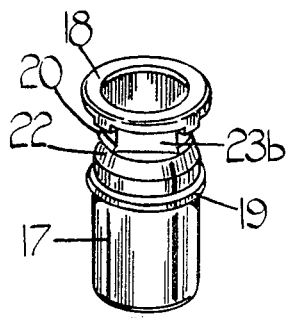
FIG.5.
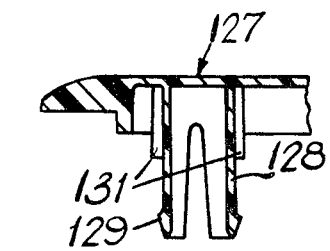
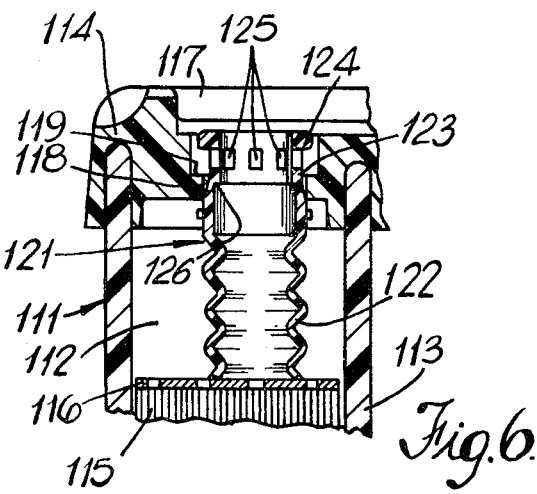
Fig.6.
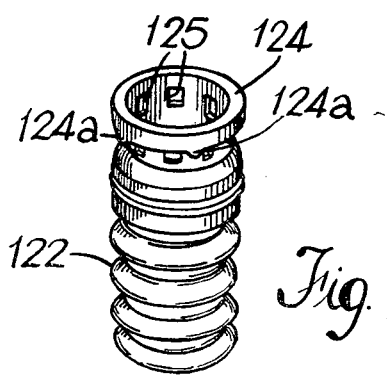
Fig.7
INVENTOR
Charles Henry Goldingay.
BY Holman, Glascock,
Downing + Seebold.
ATTORNEYS.

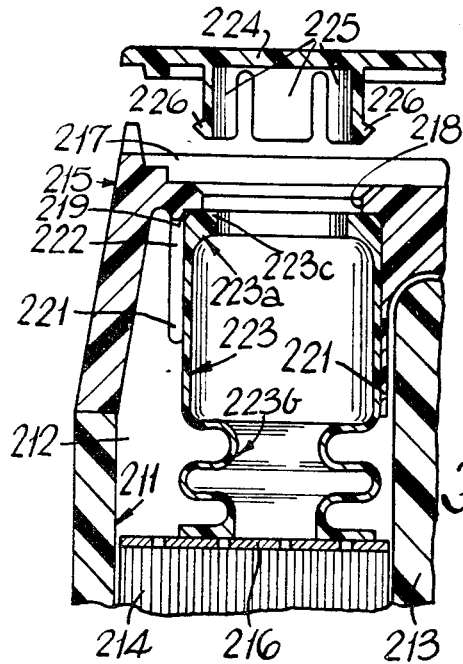
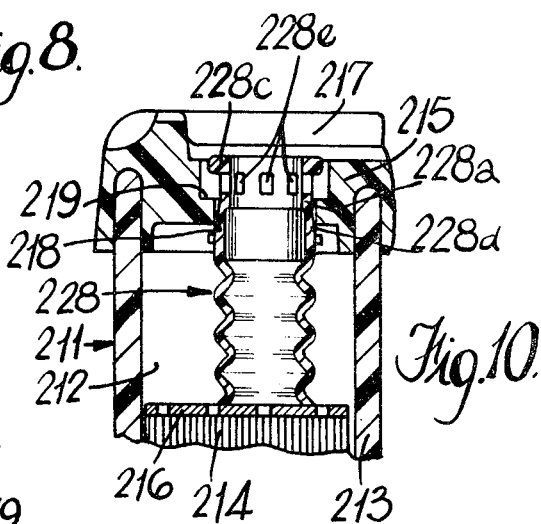
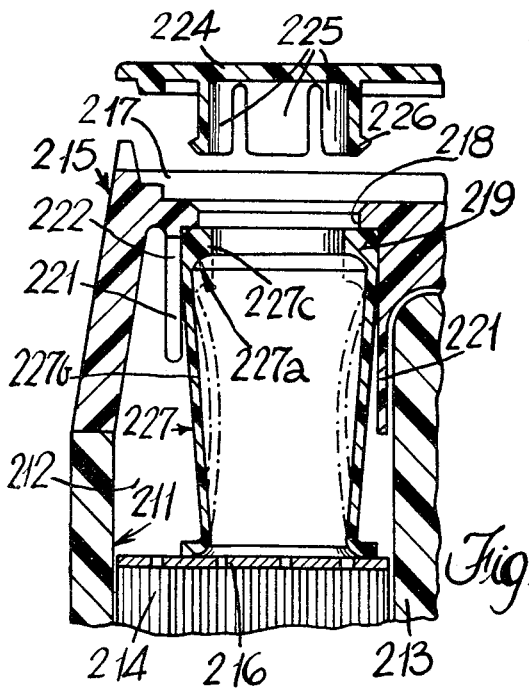

United States Patent Office 3,508,972
Patented Apr. 28, 1970

3,508,972
BATTERY WITH FILLING VENTING DEVICE
Charles Henry Goldingay, Solihull, England, assignor to Joseph Lucas (Industries) Limited, Birmingham, England, a British company
Continuation-in-part of application Ser. No. 681,660, Nov. 9, 1967. This application Dec. 20, 1968, Ser. No. 785,493
Claims priority, application Great Britain, Nov. 14, 1966, 50,874/66
Int. Cl. H01m *1/02, 7/00*
U.S. Cl. 136—170                                        8 Claims

ABSTRACT OF THE DISCLOSURE

In an electric storage battery a filling and venting device is provided which includes a moulded sleeve slidable in a bore in the lid of the battery. The sleeve can move between a first position in which the cell of the battery is closed to atmosphere, other than through the sleeve, and a second position in which the cell is open to atmosphere through a path other than through the sleeve. When a cover engages the lid of the battery it moves the sleeve to its second position, and when the cover is disengaged it moves the sleeve to its first position. The lower end of the sleeve may be resilient and acts against a fixed abutment to urge the sleeve upwardly, and the movement of the sleeve can be effected by the resilient portion of the sleeve, or by the lid, or by a combination of both.

---

This invention, which is a continuation-in-part of my application No. 681,660 filed Nov. 9, 1967, which is now abandoned, relates to filling and venting devices for storage batteries, and to batteries incorporating such devices. The various objects of the invention will become apparent from the following disclosure and claims.

In the accompanying drawings:

FIGURE 2 is a fragmentary sectional view of one cell of the battery shown in FIGURE 1 with its associated device in its second operative position;

FIGURE 3 is an enlarged perspective view of a sleeve shown in FIGURE 1;

FIGURES 4 and 5 are views similar to FIGURE 3 of two alternative forms of the sleeve;

FIGURE 6 is an exploded fragmentary view of a battery according to a second example of the invention;

FIGURE 7 is a perspective view of a sleeve used in FIGURE 6;

FIGURE 8 is a fragmentary sectional view of an electric storage battery in accordance with another example of the invention;

FIGURE 9 is a view similar to FIGURE 8 but showing a modification of the sleeve shown in FIGURE 8, and FIGURE 10 is a view similar to FIGURE 8 of an electric storage battery in accordance with another example of the invention.

Figure 1:
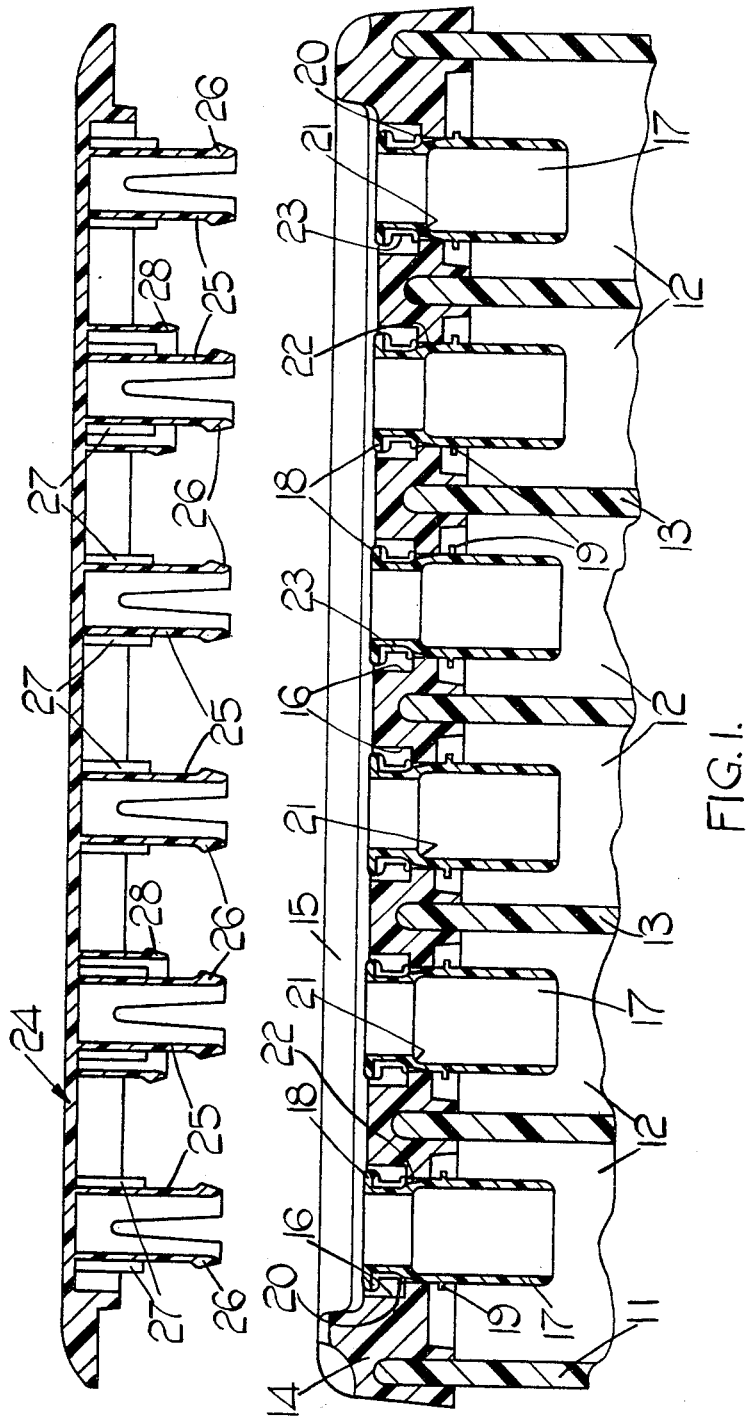
FIGURE 1 is a fragmentary sectional view of a battery according to one example of the invention showing the devices associated with the cells thereof in their first operative position.

Referring first to FIGURES 1 to 5, the battery includes a casing 11, divided into cells 12 by partition walls 13, the casing being closed by a lid 14. The lid 14 is moulded with a longitudinal groove 15 which communicates with each cell 12 through respective stepped bores 16 in the base of the groove 15. Slidably received in the narrower part of each bore 16 is a sleeve 17, each sleeve 17 being moulded in synthetic resin and including a circumferential rib 18 at one end thereof. Between its ends each sleeve is formed externally with an outwardly directed circumferentially extending flange 19 and each sleeve is formed internally with a shoulder 21. Furthermore each sleeve 17 includes between the rib 18 and the flange 19 a tapering portion 22 which terminates in a plurality of axially extending flutes 23. In use the groove 15 is closed by a member 24 formed integrally with a plurality of resilient spigots 25. When the member 24 is engaged with the groove 15 each spigot 25 is housed within a respective sleeve 17, an external circumferential rib 26 on each spigot engaging the shoulder 21 of its respective sleeve 17, while a pair of longitudinally extending ribs 27 on each spigot 25 engage the rib 18 of the respective sleeve 17.

Two of the spigots 25, on opposite sides respectively of the transverse centre line of the battery have coaxial therewith a respective cylindrical resilient catch member 28 which engages the wall of the wider parts of the bore 16 when the member 24 is engaged with the groove 15, to maintain the member 24 engaged with the groove 15, the members 28 being longitudinally split to render them resilient.

In order to fill each cell of the battery simultaneously with a metered quantity of electrolyte, the member 24 is removed. As the member 24 is removed, the engagement of the ribs 26 of the spigots 25 with the shoulders 21 of the sleeves 17, causes the sleeves 17 to be partially withdrawn from the bores 16, to a position wherein their tapered portion 22 wedges in the narrower portion of the respective bore 16. When movement of the sleeves 17 is arrested, further movement of the member 24 causes the spigots 25 to be flexed to allow their ribs 26 to ride past the shoulders 21 so that the member 24 can be removed. The sleeves 17 are so proportioned that in this position the lower ends of the sleeves are below the desired electrolyte level in each cell. The flanges 19 of the sleeves 17 engage the lower faces of the lid 14 in the event that the sleeves 17 are withdrawn from the bores 16 by more than the desired amount and thereby prevent total withdrawal of the sleeves 17.

Electrolyte is now poured into the groove 15. The electrolyte enters the cells 12 through the sleeves 17 and the level of electrolyte rises in the cells until it reaches the lower ends of the sleeves 17 whereupon the sleeves 17 themselves are filled with electrolyte. When the sleeves 17 are full the flow of eelctrolyte into the groove 15 is stopped. The level of electrolyte in the cells is now just below the desired level, but the electrolyte filling the sleeves 17 cannot enter the cells to bring the electrolyte up to the desired level since there is a volume of air trapped between the level of the lower ends of the sleeves 17 and the lid 14 by the seal formed at the engagement of the portions 22 of the sleeves with their respective bores 16.

The member 24 is now replaced and in doing so the ribs 27 engage the circumferential ribs 18 and the sleeves 17 are pushed into the cells until their ribs 18 engage the step between the wider and narrower portions of their respective bores 16. Thus the sealing engagement of the sleeves 17 with their respective bores 16 is broken and the trapped air can escape from the cells 12 through the flutes 23 in the sleeves 17, allowing the electrolyte in the sleeves to flow into the cells. The quantity of electrolyte which flows from each sleeve 17 is sufficient to raise the level of the electrolyte in each cell to the desired level.

The sleeves 17 are provided with broken circumferential ribs 20 between their ribs 18 and their portions 22 which rest on the steps defined between the wider and narrower portions of their respective bores 16 when the sleeves 17 are in their first position. The ribs 20 aid the wedging action of the portions 22 of the sleeves 17 in maintaining the sleeves 17 in their second position and are deformed as the sleeves 17 are moved to their second position, wherein the ribs 20 are accommodated, in their deformed condition, in the narrower portions of their respective bores 16.

Gases which are evolved within each cell in use can escape through the flutes in the sleeves 17 and also through the sleeves themselves and the longitudinal slots in the spigots 25 to the groove 15 from which they are vented to atmosphere, it being appreciated that where a spigot 25 is equipped with a member 28 the gases reach the groove 15 through the split in the member 28.

In the alternative form of sleeve 17 shown in FIGURE 4 the flutes 23 are replaced by holes 23a in the alternative form of sleeve shown in FIGURE 5 the upper end of the sleeve 17 between the portion 22 thereof and the rib 18 is of non-circular cross-section having a pair of diametrically opposite flat surfaces 23b.

Since the ribs 19 of the sleeves 17 are merely provided as a safety measure they could be dispensed with if desired.

Referring now to FIGURES 6 and 7, the battery includes casing 111 which is divided into cells 112 by partition walls 113. The casing 111 is closed by a moulded lid 114 and each of the cells 112 houses a pack 115 of battery plates and separators. The packs 115 are so dimensioned that an air space is left in each cell 112 between the lids 114 and the pack 115, and on top of each pack 115 there is provided a perforated baffle which minimises splashing of electrolyte from around the respective pack 115 in use, and which is positioned below the desired level of electrolyte in the cell.

The lid 114 includes a longitudinal channel 117 which communicates with the cells 112 through respective bores 118 in the lid 114. Each of the bores 118 is of reduced diameter at its inner end, a shoulder 119 being defined at the junction of the wider and narrower parts of each bore 118. Extending through each of the bores 118 is a hollow moulded sleeve 121, the inner end of which is in the form of an axially resilient bellows 122 which engages the respective baffle 116. The outer end 123 of the sleeve 121 is formed with a peripheral flange 124 at its free end, the diameter of the flange 124 being greater than the diameter of the narrower part of the respective bore 118 and the flange 124 having integrally formed therewith outwardly extending portions 124a between which are defined grooves. The external diameter of the end 123 tapers from a maximum adjacent the portion 122 to a minimum partway along the length of the end 123 and between the flange 124 and the end of the tapering part of the end 123, the end 123 is formed with a circumferential row of apertures 125. Moreover adjacent the end of the tapering part of the end 123 the inner surface of the sleeve 121 includes an inwardly presented radially extending peripheral shoulder 126.

Engageable with the lid 114 to close the channel 117 is cover 127 which is formed integrally with a plurality of resilient spigots 128. When the cover 127 is engaged with the lid 114 each spigot 128 is housed within a respective sleeve 121, an external circumferential rib 129 at the free end of each spigot 128 engaging the shoulder 126 of its respective sleeve 121 while a pair of diametrically opposite longitudinally extending ribs 131 on each spigot 128 engage the flange 124 of the respective sleeve 121. Moreover as the cover 127 is engaged with the lid 114 the ends 123 of the sleeves 121 are moved inwardly against the resilience of the ends 122 of the sleeve until the flanges 124 engage the respective shoulders 119.

Two of the spigots 128 on opposite sides respectively of the transverse centre line of the battery have coaxial therewith respective cylindrical resilient catch members (not shown) which engage the wall of the wider parts of the respective bores 118 when the cover is engaged with the lid 114, to maintain the cover 127 engaged with the lid 114. The catch members being longitudinally split to render them resilient.

In order to fill each cell of the battery simultaneously with the metered quantity of electrolyte, the cover 127 is removed. As the cover 127 is removed, the engagement of the ribs 129 with the shoulders 126 together with the resilience of the ends 122 of the sleeve 121 causes the sleeves 121 to be partially withdrawn from the bores 118, to a position wherein their tapering portion wedges in the narrower portion of the respective bore 118. When movement of the sleeves 121 is arrested, further movement of the cover 127 causes the spigots 128 to be flexed to allow their ribs 129 to ride past the shoulders 126 so that the cover 127 can be removed.

Electrolyte is now poured into the channel 117. The electrolyte enters the cells 112 through the sleeves 121 and the level of electrolyte rises in the cells until it reaches the inner ends of the sleeves 121, that is to say the level of the baffles 116, whereafter the sleeves 121 themselves are filled with electrolyte. When the sleeves 121 are full the flow of electrolyte into the channel 117 should be stopped. The level of electrolyte in the cells is now just below the desired level, and the electrolyte filling the sleeves 121 cannot enter the cells because there is a volume of air trapped between the level of the inner ends of the sleeves 121 and the lid 114 by the seal formed at the engagement of the tapered portions of the sleeves with their respective bores 118.

The cover 127 is now replaced and in doing so the ribs 131 engage the flanges 124 of the sleeves 121 and the sleeves 121 are pushed into the cells against the resilience of their respective ends 122 until their flanges 124 engage the shoulders 119 of their respective bores 118. Thus the sealing engagement of the sleeves 121 with their respective bores 118 is broken and the trapped air can escape from the cells 112 through the apertures 125 in the sleeves 121 and the grooves defined between the portions 124a, so allowing the electrolyte in the sleeves to flow into the cells. The quantity of electrolyte which flows from each sleeve 121 is sufficient to raise the level of the electrolyte in each cell to the desired level. The ends 122 of the sleeves 121 are designed so that even when the sleeves 121 are in sealing engagement with their respective bores 118, the ends 122 are still compressed and so help to maintain the sleeves 121 in sealing engagement with the respective bores 118.

Referring now to FIGURES 8 to 10, the battery includes a casing 211 which is divided into compartments 212 by partition walls 213. Each compartment 212 houses a battery plate pack 214 and the casing and compartments are closed by a lid 215. The compartments are of greater depth than the respective pack 214 so that an air gap is left in each compartment between the lid 215 and the respective pack 214. Within each compartment 212 and lying on top of the respective pack 214 is a perforated baffle 216 which inhibits splashing of electrolyte within the respective compartment in use. The baffles 216 are just below the desired electrolyte level in their respective compartments.

The lid 215 is formed on its outer surface with a longitudinally extending channel 217 and the channel 217 communicates with the compartments 212 through respective bores 218 in the lid of the battery. The bores 218 are stepped to provide respective inwardly presented shoulders 219 and the wall of the wider parts of the bores 218 are extended inwardly towards the baffles 216. The extensions 221 of the walls of the bores 218 are formed with axially extending slots 222 (one of which is shown in FIGURE 1).

Mounted within the wider part of each of the bores is a moulded synthetic resin sleeve 223. Each sleeve is in two integral portions, a valve portion 223a and an axially resilient portion 223b, in the form of a bellows. The free end of the axially resilient portion 223b engages the baffle 216 in its respective compartment 212 and serves to urge its respective valve portion 223a upwardly into a first position, in sealing engagement with the shoulder 219 of the respective bore 218. When the portion 223a of a sleeve is in its first position the respective compartment 212 is closed to atmosphere other than through the sleeve itself.

Engageable in the channel 217 in the lid 215 is a moulded synthetic resin cover 224 which is formed with a plurality of sets of resilient fingers 225 which extend at right angles to the cover 224. Each set of fingers 225 is arranged to lie on the circumference of an imaginary circle of diameter substantially equal to that of the wider parts of the bores 219.

The portion 223a of each sleeve is formed at its free end with an inwardly directed peripheral flange 223c the inner diameter of which is smaller than the diameter of the narrower part of its respective bore 218. Thus when the cover 224 is engaged in the channel 217 the sets of fingers 225 enter respective bores 218 in the lid and engage the flanges 223c of the respective sleeves 223. The portions 223a of the sleeves 223 are moved downwardly to a second position wherein the sealing engagement between the sleeves 223 and the shoulders 219 is broken and the compartments 212 are vented through the respective slots 222 and bores 218. The fingers 225 each include outwardly directed barbs 226 which engage the respective shoulders 219 to maintain the cover 224 in position, the fingers 225 flexing to permit the cover to be engaged with and disengaged from the lid 214.

In the modification shown in FIGURE 9 the sleeves 223 are replaced by moulded synthetic resin sleeves 227, the remainder of the battery being unchanged. The sleeves 227 still include a valve portion 227a, a resilient portion 227b and a flange 227c, but the portions 227b of the sleeves 227 are now in the form of a tapering, hollow, thin walled cylinder. The wall of the cylinders is deformed, as indicated in dotted lines in FIGURE 9, during movement of the portions 227a of the sleeves 227 to their second position, and the resilience of the walls urges the portions 227a to their first position.

Referring now to FIGURE 10, the battery includes parts common to the batteries described with reference to FIGURES 8 and 9 and such parts are indicated by the reference numerals which they bear in FIGURES 8 and 9. The construction of the casing and lid of the battery is similar to that described above, except that the shoulders 219 of the bores 218 are upwardly directed and the internal extensions 221 are omitted.

Mounted within the narrower, inner parts of each of the bores 218 is moulded synthetic resin sleeve 228, each sleeve 228 including a valve portion 228a and an axially resilient bellows portion 228b. The free end of the portion 228a of each sleeve is formed with an outwardly directed flange 228c of diameter greater than the diameter of the narrower part of its respective bore 218 and less than the diameter of the wider part of the bore 218. Moreover, adjacent the junction of the portions 228a, 228b, the portion 228a of each sleeve is formed with a tapering part 228D. The diameter of the part 228d tapers from a maximum diameter, greater than the diameter of the narrower part of the respective bore 218, at the end of the part 228d adjacent the junction of the portions 228a, 228b, to a minimum diameter, less than the diameter of the narrower part of the bore 218, at the end of said part remote from said junction. Between the narrower end of the part 228d and the flange 228c the portion 228a is formed with circumferentially extending row of apertures 228e.

The free end of the portion 228b of each of the sleeves 228 engages the baffle 216 in its respective compartment 212 and the portions 228b of the sleeves 228 urge their respective portions 228a upwardly to a first position wherein the parts 228d wedge in sealing engagement with the narrower parts of their respective bores 218.

Associated with the lid 215 of the battery is a cover (not shown) similar to the cover 224. The cover includes a plurality of downwardly directed fingers which engage the flanges 228c of the sleeves 228 respectively, when the cover is engaged with the lid 215, to move the portions 228a of the sleeves 228 to a second position wherein the sealing engagement between the wall of the narrower parts of the bores 218 and the parts 228d of the sleeves 228 is broken. When the portions 228a of the sleeves 228 are in their first position the compartments 212 are sealed from atmosphere other than through the sleeves themselves while when the portions 228a of the sleeves 228 are in their second position the compartments are vented to atmosphere through the apertures 228e in the sleeves. The cover and the lid 215 are provided with co-operating latch means for maintaining the cover in engagement with the lid 215.

In order to fill the compartments of any of the batteries shown in FIGURES 8 to 10 to the desired level with electrolyte, the battery cover is removed, whereupon the sleeves are moved by their resilient portions to their first positions. Electrolyte is then poured into the channel 217 of the battery and flows into the compartments of the battery through the bores 218 and the sleeves. The electrolyte level in the compartments rises until it reaches the lower ends of the sleeves, that is to say the level of the baffles, whereupon no more electrolyte can flow into the compartments, since the space between the lower ends of the sleeves and the lid 215 is sealed by the sleeves. The level of electrolyte in each compartment of the battery is now just below the desired level. Electrolyte now flows from the channel 217 to fill the sleeves with electrolyte and when the sleeves are full the flow of electrolyte into the channel 217 should be halted. The cover is now replaced and in so doing the sleeves are moved to their second positions. When the sleeves reach their second positions the spaces between the lid 215 and baffles 216 of each compartment are then vented to atmosphere as described above, and consequently electrolyte flows from the sleeves into their respective compartments to equalize the electrolyte levels in the sleeves and their respective compartments. The volume of the sleeves is so chosen that the volume of electrolyte which flows from the sleeves into their respective compartments is sufficient to raise the electrolyte levels in the compartments to the desired level.

Having thus described my invention what I claim as new and desire to secure by Letters Patent is:

1. A battery provided with a filling and venting device for filling a cell of the battery to the desired level with electrolyte; said battery having a lid, said device including a moulded sleeve having inner and outer ends mounted in a bore in the lid of the battery for sliding movement between a first position in which the cell of the battery is closed to atmosphere, other than through the sleeve itself and the inner end of the sleeve is a predetermined distance below the desired level of electrolyte in the cell, and a second position in which the cell is open to atmosphere other than through the sleeve itself, said sleeve including a first portion which engages the lid of the battery when the sleeve is in said first position, said first portion tapering from a maximum diameter at its inner end to a minimum diameter at its outer end so as to wedge against the wall of the inner end of said bore in said first position, the sleeve further including a second portion spaced outwardly along the sleeve from the first portion and which engages the lid of the battery in the second position of the sleeve to prevent the sleeve being moved inwardly beyond its second position, and a third portion between said first and second portions shaped to provide communication between the cell and atmosphere other than through the sleeve when the sleeve is in said second position, the device further incorporating a removable cover positioned on the lid of the battery and in contact with the sleeve so that as the cover is engaged with the lid of the battery the sleeve is moved to its second position and as the cover is disengaged from the lid of the battery the sleeve is moved to its first position.

2. A battery as claimed in claim 1 wherein said sleeve includes a broken circumferentially extending rib which is positioned between said first and second portions and which engages the outer end of said bore in the first position of the sleeve to aid the wedging action of said first portion of the sleeve in maintaining the sleeve in its first position.

3. A battery as claimed in claim 1 including a plurality of cells, a plurality of bores in the lid, and sleeves mounted in the bores wherein the first portion of each sleeve is defined by a portion of the sleeve which tapers from a maximum diameter at its inner end to a minimum diameter at its outer end and which wedges against the wall of the inner end of the respective bore in the lid in the first position of the sleeve.

4. A battery as claimed in claim 3 wherein each sleeve includes a broken circumferentially extending rib which is positioned between the first and second portions of the sleeve and which engages the outer end of the respective bore in the lid in the first position of the sleeve, so as to aid the wedging action of said first portion of the sleeve in maintaining the sleeve in its first position.

5. A battery as claimed in claim 1 further including a plurality of cells, a plurality of bores in the lid, and sleeves mounted in the bores wherein said cover includes a plurality of resilient spigots extending within said sleeves respectively, the spigots including respective outwardly directed ribs which engage respective inwardly directed internal shoulders in the respective sleeves as the cover is disengaged from the lid so that the respective sleeves are moved to their first positions, each spigot flexing during subsequent movement of the cover away from the lid to allow its rib to ride over the shoulder of the respective sleeve so that the cover can be removed leaving each sleeve in its first position.

6. A battery as claimed in claim 5 wherein each spigot includes a further outwardly directed rib which engages the outer end of the respective sleeve during engagement of said cover with said lid so that subsequent movement of said cover towards said lid moves said sleeves to their second positions.

7. A battery as claimed in claim 5 wherein the cover incorporates at least one resilient cylindrical part integral with the lid and surrounding one of said spigots, said resilient cylindrical part co-operating with a part of the lid for maintaining the cover in engagement with the lid.

8. A battery as claimed in claim 1 wherein said inner end of said sleeve is resilient in an axial direction and engages a fixed abutment which is positioned in the cell below the desired level of electrolyte in the cell by a predetermined distance, so that as said cover is engaged with the lid of the battery the outer end of the sleeve is moved inwardly to said second position against the resilience of the inner end of the sleeve and as the cover is disengaged from the lid said outer end of the sleeve is moved from its second position to its first position by the co-action of the cover with the sleeve aided by the resilience of the inner end of the sleeve.

References Cited

UNITED STATES PATENTS

| 2,257,514 | 9/1941 | Raney | 136—178 |
| 2,277,257 | 3/1942 | Rieser | 136—178 |
| 2,299,507 | 10/1942 | Simms et al. | 136—178 |
| 2,971,045 | 2/1961 | August | 136—178 |
| 3,161,548 | 12/1964 | Goldingay | 136—177 |

FOREIGN PATENTS

| 972,787 | 10/1964 | Great Britain. |
| 285,906 | 1/1953 | Switzerland. |

ALLEN B. CURTIS, Primary Examiner

DONALD L. WALTON, Assistant Examiner

U.S. Cl. X.R.

136—178